T. J. McVEY.
BELT SHIFTER.
APPLICATION FILED APR. 9, 1907.
924,624.
Patented June 8, 1909.
2 SHEETS—SHEET 1.
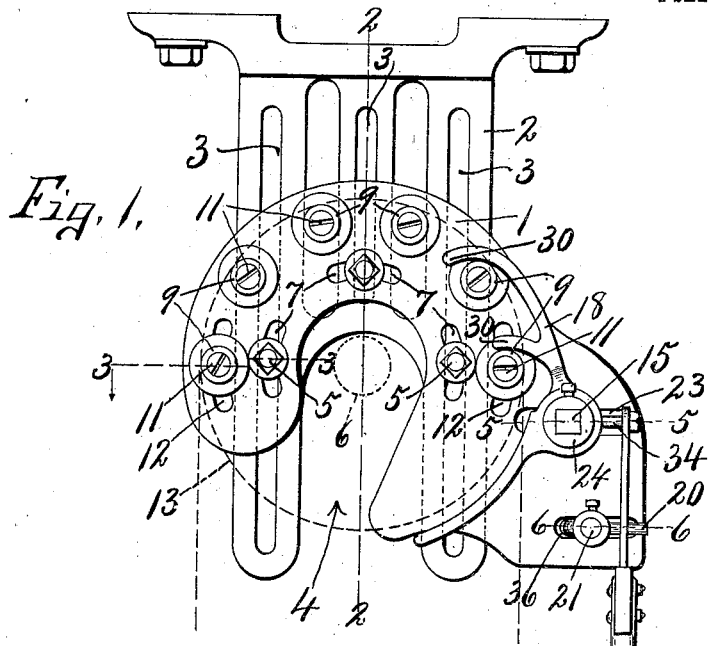
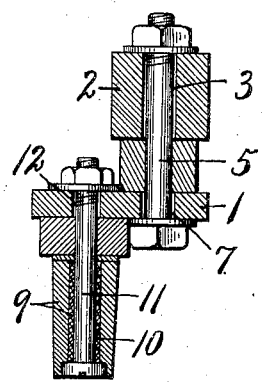
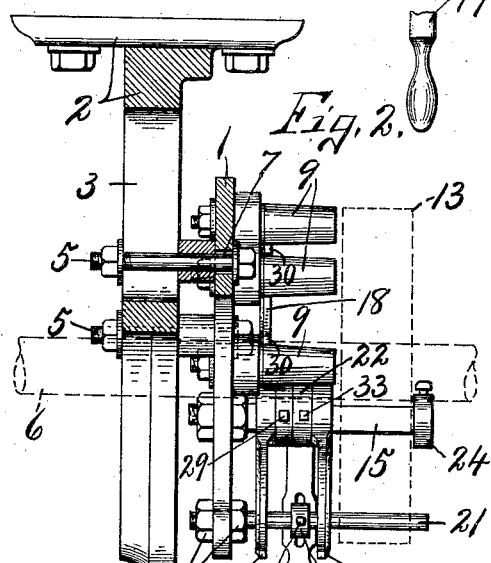
WITNESSES:
INVENTOR
T. J. McVey
BY
Howard P. Drinsow
ATTORNEY.

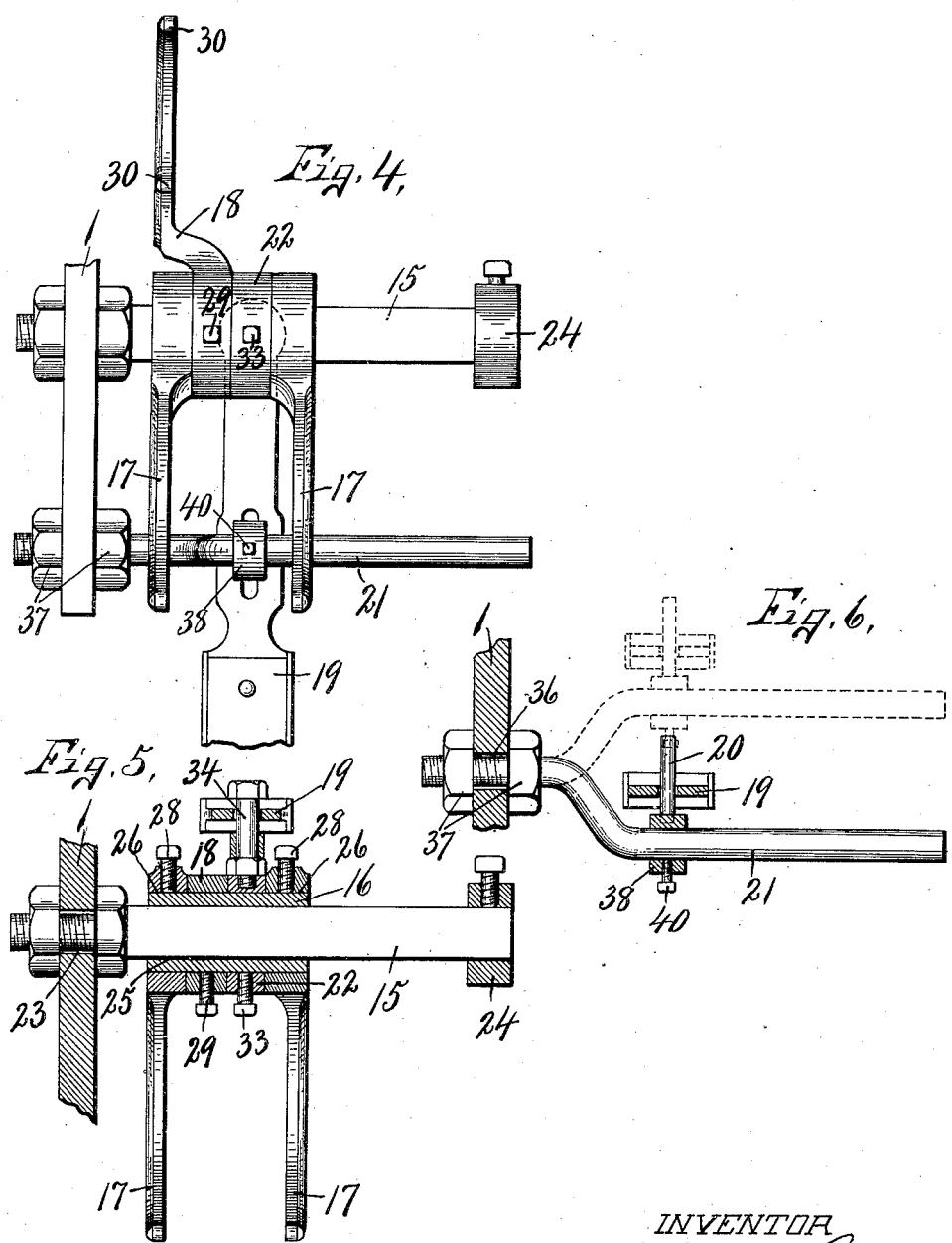

UNITED STATES PATENT OFFICE.

THEODORE J. McVEY, OF SYRACUSE, NEW YORK.

BELT-SHIFTER.

No. 924,624.  Specification of Letters Patent.  Patented June 8, 1909.

Application filed April 9, 1907. Serial No. 367,265.

*To all whom it may concern:*

Be it known that I, THEODORE J. MCVEY, of Syracuse, in the county of Onondaga, in the State of New York, have invented new and useful Improvements in Belt-Shifters, of which the following, taken in connection with the accompanying drawings, is a full, clear, and exact description.

This invention relates to certain improvements in belt shifters of the class set forth in my pending application No. 307,612, filed March 23, 1906, and allowed July 13, 1906, in which a reversible and invertible disk or plate carrying a circular series of roller bearings for the belt is adjustably mounted upon a fixed hanger and adapted to be tilted around the axis of the shaft to receive and support the belt when not in use. This roller supporting plate was made adjustable toward and from and circumferentially around the axis of the shaft to enable it to be used in connection with different sizes of pulleys and different positions of the belt which it is adapted to receive.

The several rollers for receiving the belt were also made adjustable circumferentially around the shaft to conform to different degrees of lap of the belt. It therefore, becomes necessary to provide a belt shifting mechanism which may be readily adjusted to conform to the different adjustments of the belt supporting rollers and plate upon which said rollers are mounted.

My object, therefore, is to provide the shifting belt with two sets of arms or belt-shifting fingers; one set engaging the belt at one side of its axis of adjustment, and the other set engaging said belt at the opposite side of said axis. In other words, in addition to the pair of belt-adjusting fingers which are employed to shift the belt in both directions, I use an additional finger or fingers for shifting the belt from the rollers onto the pulley, it being understood that these latter fingers engage only the edge of the belt nearest the plate upon which the rollers are mounted.

A further object is to provide for the adjustment of the sliding bolt or sleeve toward and from the axis of the shaft, and to mount the entire belt-shifting mechanism upon the same plate which supports the belt-sustaining rollers.

A still further object is to shift the sliding bolt or sleeve by means of a lever, and to make the fulcrum of said lever, and also the connections of such lever with the sliding bolt, adjustable independently of the plate or belt-shifting fingers so that the lever may be arranged at any desired angle.

Other objects and uses will appear in the following description.

In the drawings—Figure 1 is a face view of my improved belt-shifting mechanism, the pulley and belt being shown in dotted lines. Figs. 2 and 3 are sectional views taken on lines 2—2, and 3—3, Fig. 1. Fig. 4 is an inner face view of the belt-shifting arms and their actuating mechanism, showing also a portion of the roller-supporting plate upon which said parts are mounted. Figs. 5 and 6 are sectional views taken respectively on lines 5—5, and 6—6, Fig. 1.

The particular belt-shifting mechanism forming the subject-matter of my present application may be used in connection with any roller-supporting plate whether adjustable or not, but it is particularly adapted for use in connection with a reversible and invertible plate —1— similar to that set forth in my pending application above referred to, and which is adjustably mounted upon a hanger —2—, the latter being adapted to be secured to the ceiling, floor, or partition of a building. This hanger —2— is provided with a series of, in this instance, three parallel slots —3— arranged around a central shaft-opening —4— for receiving clamping bolts —5— by which the plate —1— is rigidly clamped to the hanger, the vertical slots —3— permitting a limited adjustment of the roller-supporting plate —1— toward and from the shaft, as —6—, shown by dotted lines in Figs. 1 and 2.

The roller-supporting plate —1— is for the greater part, circular in general outline, and flat, that is, its opposite faces are parallel which enables it to be reversed or inverted and either face applied to the hanger, or, it may be applied to either face of the hanger as the opposite faces of the hanger are similar and substantially parallel.

The clamping bolts —5— are passed through elongated slots —7— in the plate —1—, said slots being elongated concentrically with the axis of the shaft —6— to permit a limited circumferential adjustment of said plate around the shaft according to the position or angle of the belt. I have shown the plate —1— as provided with a series of, in this instance, six tapered belt-supporting rollers —9— each having an inner noiseless bearing sleeve —10— of fiber, or similar material journaled upon a stud —11—. These studs —11— are passed through suitable apertures —12— in the plate —1— to which they are clamped, said rollers being arranged in a semi-circular row concentric with the shaft —6—.

The apertures —12— for receiving the studs —11— of the end rollers of the series are elongated concentrically with the shaft to permit said end rollers to be adjusted to conform to different laps of the belt.

The tapered or small ends of the rollers —9— are arranged in close proximity to the end of the pulley, as —13—, shown by dotted lines in Figs. 1 and 2, and with which the entire belt-shifting mechanism is associated, the outer faces of said rollers being disposed in substantially the same plane as the periphery of the pulley so as to enable said belt to be easily shifted back and forth from the pulley to the rollers and vice versa, the taper of the rollers facilitating this shifting action.

The belt-shifting mechanism proper is mounted wholly upon and is adjustable with the plate —1— and comprises in this instance, a stud or bolt —15—, a sleeve —16— slidable lengthwise of the bolt, a pair of belt-shifting arms —17— adjustably mounted upon the sleeve —16—; an additional belt-shifting arm —18— also adjustably mounted upon the sleeve —16—, and a lever —19— which is engaged with an adjustable fulcrum —20— on an adjustable support —21— and is connected to an adjustable collar —22— on the sleeve —16—.

The stud —15— is secured at one end in a slot —23— of the plate —1— preferably outside of the line of travel of the belt and projects laterally some distance parallel with the axes of the shaft —6— and rollers —9—, and is preferably angular in cross section and provided at its extreme outer end with a limiting stop, as a collar, —24—. The length of this angular stud —15— is substantially equal to, or slightly greater than the combined length of one of the rollers —9— and face of the pulley —13— across which the stud extends.

The sleeve —16— has a central opening —25— which is angular in cross section to fit upon the stud —15— along which it is adapted to slide in shifting the belt from one extreme position to the other, or rather from the pulley onto the rollers, and vice versa.

The periphery of the sleeve —16— is circular, and the belt-shifting arms —17— are provided with circular openings —26— fitting snugly upon the sleeve —16—, said arms being adjustable circumferentially around the sleeve to conform to different positions of the belt with which they are to engage, and are held in their adjusted position by set screws —28—. The other belt-shifting arm —18— is also mounted upon the sleeve —16— and adjustable circumferentially thereon and is held in place by a suitable set screw —29—. This arm —18— is offset laterally to bring its outer face in line with the outer face of the arm —17— nearest the plate —1—, and is provided with belt-engaging fingers —30— disposed one above the other in the same vertical plane and adapted to overhang or rather to project beyond the outer faces of one or more of the rollers —9— to engage the inner edge of the belt nearest the plate —1— and thereby facilitate the shifting of the belt from the rollers onto the pulley. These arms —17— and —18— project in opposite directions from the stud —15—, the arms —17— being spaced apart a distance corresponding to the width of the belt so as to engage the opposite edges of said belt for shifting the latter in either direction while the other arm —18— is offset toward the plate —1— in line with the rear arm —17— to enable the belt to be more readily shifted from the rollers onto the pulley. The collar —22— is also adjustably mounted upon the sleeve —16— and held in its adjusted position by a set screw —33—, said collar being provided with a radially projecting stud —34— to which the upper end of the lever —19— is pivoted. It is now apparent that the arms —17— and —18— and stud —34— are adjustable circumferentially and that the stud —15— is adjustable toward and from the shaft —6—, such adjustments enabling the shifting device to be used with any size pulley.

One end of the stud —21— is inserted in an elongated slot —36— in the plate —1— which enables it to be adjusted toward and from the vertical plane of the shaft —6— to conform to the adjustment of the stud —15— and is clamped to said plate —1— by suitable lock-nuts —37—. The primary function of this arm —21— is to support the shifting lever —19— and in order that the fulcrum of the lever may be adjusted to conform to the position of such lever and its connection with the collar —22— the portion upon which the fulcrum —20— is mounted is offset laterally from the portion which enters the plate —1— and the collar, as —38—, to which the fulcrum —20— is secured is adjustable circumferentially upon the offset portion of the arm —21— to still further conform to the particular position in which it may be desired to place the lever —19—, said collar —38— being held in its adjusted position by set screw —40—. This adjustment of the lever supporting element, as the collar —22—, fulcrum —20—, and supporting arm —21—, all contribute to afford a wide range of adjustment to conform to different sizes of pulleys and to different angles or laps of the belt.

What I claim is:

1. In a belt-shifting mechanism, a roller-supporting plate and a series of rollers mounted thereon around a common axis, a stud rigidly secured to the plate, a non-rotatable sleeve adjustable along the stud, belt shifting arms separately adjustable circumferentially upon the sleeve, one of said arms having two belt-engaging fingers disposed in the same vertical plane one above the other for securing said arms in their adjusted position upon the sleeve and additional means for moving said sleeve along the stud.

2. In a belt-shifting mechanism of the class described, a roller-supporting plate and a series of rollers mounted thereon around a common axis, a stud projecting from said plate parallel with said axis and adjustable toward and from such axis, means for securing the stud to the plate, a sleeve slidable lengthwise on the stud, means for actuating said sleeve and oppositely projecting fingers mounted upon and adjustable circumferentially around the sleeve, and separate means for clamping said fingers to the sleeve.

3. In a belt-shifting mechanism of the class described, a roller-supporting plate and a series of rollers mounted thereon around a common axis, a pair of belt-engaging arms and a sliding support therefor, means mounted on the plate to actuate said support, and an additional belt-shifting arm having a plurality of belt-shifting fingers movable along said rollers, said arm being adjustable circumferentially around the support.

4. In a belt-shifting mechanism, a supporting stud, a sleeve slidable on the stud, belt-shifting fingers secured to the sleeve, a pin adjustable circumferentially upon the sleeve, a fulcrum pin and support therefor, said fulcrum pin being also adjustable circumferentially upon its support and a lever fulcrumed upon one of the pins and pivotally connected to the other pin for shifting the sleeve back and forth along its support.

In witness whereof I have hereunto set my hand this 23d day of March, 1907.

THEODORE J. McVEY.

Witnesses:
H. E. CHASE,
M. M. NOTT.